United States Patent
Flores et al.

(10) Patent No.: US 7,685,016 B2
(45) Date of Patent: Mar. 23, 2010

(54) METHOD AND SYSTEM FOR ANALYZING RELATIONSHIPS BETWEEN PERSONS

(75) Inventors: Romelia H. Flores, Keller, TX (US); Biao Hao, Bedford, TX (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 10/680,272

(22) Filed: Oct. 7, 2003

(65) Prior Publication Data
US 2005/0075917 A1    Apr. 7, 2005

(51) Int. Cl.
*G06Q 10/00* (2006.01)
(52) U.S. Cl. .......................... 705/11; 705/1; 707/103; 707/104.1
(58) Field of Classification Search .................. 705/1, 705/11
See application file for complete search history.

(56) References Cited

U.S. PATENT DOCUMENTS

| | | | |
|---|---|---|---|
| 5,655,118 A | | 8/1997 | Heindel et al. |
| 5,713,014 A | | 1/1998 | Durflinger et al. |
| 5,835,085 A | | 11/1998 | Eick et al. |
| 5,874,964 A | | 2/1999 | Gille |
| 5,875,446 A | * | 2/1999 | Brown et al. .................. 707/3 |
| 5,995,958 A | | 11/1999 | Xu |
| 6,067,548 A | * | 5/2000 | Cheng .................... 707/103 R |
| 6,073,138 A | * | 6/2000 | de l'Etraz et al. ........ 707/104.1 |
| 6,134,706 A | | 10/2000 | Carey et al. |
| 6,151,585 A | | 11/2000 | Altschuler et al. |
| 6,338,065 B1 | * | 1/2002 | Takahashi et al. ............. 707/10 |
| 6,377,287 B1 | | 4/2002 | Hao et al. |
| 6,389,372 B1 | | 5/2002 | Glance et al. |
| 6,414,691 B1 | | 7/2002 | Nakagawa et al. |
| 6,424,968 B1 | * | 7/2002 | Broster et al. .................. 707/3 |
| 6,539,232 B2 | * | 3/2003 | Hendrey et al. .......... 455/456.1 |
| 6,539,374 B2 | * | 3/2003 | Jung ............................. 707/4 |
| 6,735,568 B1 | * | 5/2004 | Buckwalter et al. ............ 705/1 |
| 7,069,308 B2 | * | 6/2006 | Abrams ...................... 709/218 |

(Continued)

FOREIGN PATENT DOCUMENTS

JP    09-204465    8/1997

(Continued)

OTHER PUBLICATIONS

Tsai and Ghoshal, Social Capital and Value Creation: The Role of Intrafirm Networks, The Academy of Management Journal, vol. 41, No. 4 (Aug. 1998), p. 464-76.*

(Continued)

*Primary Examiner*—Beth V Boswell
*Assistant Examiner*—Justin M Pats
(74) *Attorney, Agent, or Firm*—Novak Druce + Quigg

(57) ABSTRACT

A software method for analyzing relationships between individuals can include the step of establishing a recordation framework for recording relationships between individuals. At least one relationship based on organization structure can be recorded using the established framework. Additionally, at least one relationship based upon project-specific collaborations can be recorded using the framework. At least one relationship based upon social interactions can also be recorded using the framework. The recorded relationships can be queried to determine a set of organizational, project-specific, and social relationships for a defined group of individuals.

14 Claims, 3 Drawing Sheets

U.S. PATENT DOCUMENTS

| | | |
|---|---|---|
| 7,177,880 B2 * | 2/2007 | Ruvolo et al. ............ 707/104.1 |
| 7,216,088 B1 * | 5/2007 | Chappel et al. ............... 705/11 |
| 7,325,012 B2 * | 1/2008 | Nagy ...................... 707/104.1 |
| 2002/0030703 A1 | 3/2002 | Robertson et al. |
| 2002/0038218 A1 * | 3/2002 | Senay .......................... 705/1 |
| 2002/0062240 A1 | 5/2002 | Morinville |
| 2002/0124082 A1 | 9/2002 | San Andres et al. |
| 2002/0147710 A1 | 10/2002 | Hu |
| 2002/0165763 A1 | 11/2002 | Friedlander et al. |
| 2002/0171687 A1 * | 11/2002 | Li et al. ..................... 345/853 |
| 2002/0178161 A1 | 11/2002 | Brezin et al. |
| 2003/0216942 A1 * | 11/2003 | Hawks .......................... 705/2 |
| 2003/0220980 A1 * | 11/2003 | Crane ......................... 709/207 |
| 2004/0098265 A1 * | 5/2004 | Kelly et al. ................ 704/270 |
| 2004/0249829 A1 * | 12/2004 | Kasravi ..................... 707/100 |
| 2005/0065980 A1 * | 3/2005 | Hyatt et al. .............. 707/104.1 |

FOREIGN PATENT DOCUMENTS

| | | |
|---|---|---|
| JP | 10-105598 | 4/1998 |
| JP | 2000-322473 | 11/2000 |
| JP | 2000-339169 | 12/2000 |
| JP | 2001-350883 | 12/2001 |
| NL | 1002154 C | 7/1997 |
| WO | WO 0068860 A2 * | 11/2000 |

OTHER PUBLICATIONS

Gassenheimer et al., The Role of Economic Value and Perceptions of Fairness in Interorganizational Relationship Retention Decisions, Journal of the Academy of Marketing Science, vol. 26, No. 4, 1998, p. 322-37.*

* cited by examiner

METHOD AND SYSTEM FOR ANALYZING RELATIONSHIPS BETWEEN PERSONS

BACKGROUND

1. Field of the Invention

The present invention relates to the field of computer software and, more particularly, to computer software that manages relationships.

2. Description of the Related Art

A complex web of relationships interconnects individuals in society. Understanding these relationships can allow individuals to establish new relationships with other individuals by establishing initial contact through pre-existing contacts. Further, individuals can utilize their understanding of present relationships to selectively nurture existing relationships. Properly managing interpersonal relationships can produce significant professional and personal rewards. The relationship management activities preformed by individuals can be referred to as establishing/managing a personal contact network or simply as networking.

Just as individuals can benefit from relationship management, so can organizations. For example, organizations often include teams or committees responsible for performing one or more tasks. Well-formed teams that include a proper mix of necessary skills and personalities often produce favorable results in an efficient fashion. Poorly formed teams, on the other hand, can sometimes lack the requisite skills to complete necessary tasks for the organization. Additionally, personality idiosyncrasies within poorly formed teams can spawn arguments and dissention within a team, resulting in inefficient team performance. Further, various subdivisions of an organization can have different, non-complementary division-specific agendas that can result in teams comprised of individuals from diverse divisions working at cross-purposes with one another. Generally, when extensive relationships exist between individuals, those individuals are better able to understand one another and function effectively as a team compared to teams formed from individuals not having pre-established relationships.

Numerous conventional software applications record and track aspects of interpersonal relationships. Such applications include, but are not limited to, organizational information management systems, project management applications, contact directories, genealogy applications, and personal information management systems. Organizational information management systems can include a variety of organizational relationship features, such as a feature to construct organization charts. Project management applications can record data about individuals assigned as teammates to discrete projects, the roles of the individuals within the projects, project outcomes, and the like. Genealogy programs can manage the lineages and family-relations existing between people. Personal information management systems can record and manage personal contact information for individuals, such as telephone numbers, addresses, and important dates associated with a contact.

The above applications generally operate in a manner that is primarily independent of other systems containing relationship information. For example, although a contact management system can be linked to an organizational information management system to construct telephone directories for an organization, complex relationship operations, such as determining the most meaningful relationship pathway existing between two individuals, cannot be determined by conventional applications. No known relationship management applications exist that effectively manage different types of relationships, such as organizational, project-specific, and social relationships, in a holistic fashion.

SUMMARY OF THE INVENTION

The present invention provides a method, a system, and an apparatus for managing relationships. More specifically, organizational, project-specific, and social relationships existing between individuals in an organization can be recorded according to a predefined recordation framework. The recorded relationships can be stored in a data store accessible by a relationship management system. The relationship management system can permit users to create, edit, search, and delete relationships. Searches using the relationship management system can involve more than one category of relationship and can be filtered and/or sorted based upon any of a variety of parameters.

Further, graphs visually illustrating relationships can be constructed with the relationship management system. In one exemplary graph, individuals can be illustrated as nodes and relationships between individuals can be illustrated as line segments joining the nodes. In such a graph, different types of relationships can be illustrated as visually distinct line segments; visually distinct line segments can be illustrated using different colors, thicknesses, and/or styles. For example, enhanced organizational charts can be generated using the relationship management system, where line segments between nodes that signify relationships resulting from organizational positions can be black, line segments between nodes that signify project-based relationships can be red, and line segments that signify social relationships can be blue.

One aspect of the present invention can include a software method for analyzing relationships between individuals. The method can include the steps of recording relationships based upon organization structure, project specific collaborations, and social interactions. The recorded relationships can be queried. The querying of the recorded relationships can involve interrogating different categories of data including organizational relationship data, project-specific relationship data, and social relationship data. Query results can be generated responsive to the querying of the recorded relationships. At least one chart illustrating the query result can be generated. The chart can be a unified relationship chart illustrating relationships among individuals from at least two different relationship categories. The relationship categories can include organizational relationships, project-specific relationships, and social relationships. In one embodiment, the chart can represent individuals as nodes and can represent relationships as line segments connecting the nodes. Line segments for each relationship category can be visually distinctive.

In one embodiment, an affinity value can be associated with at least one relationship. The affinity value can quantify a relative strength of the associated relationship. In a further embodiment, a relationship can be a bidirectional relationship that is relatively stronger in one direction than in another. That is, a first affinity value can be associated with a relationship to indicate the relative strength of the relationship in one direction. A second affinity value can be associated with the relationship to indicate the relative strength of the relationship in another direction.

In another embodiment, at least two individuals can be identified. A relationship linkage can be determined between the identified individuals. In a further embodiment, at least two relationships can be determined between the identified individuals. A linkage strength for each relationship linkage can be determined. A preferred one of the relationship linkages can be selected based upon the linkage strength values. In one embodiment where affinity values are associated with relationships, the linkage strengths can be based upon affinity values for relationships that are included within the relationship linkages. For example, a linkage strength can be the summation of affinity values for relationships comprising the relationship linkage.

In yet another embodiment, at least one communication can be detected between two individuals. Communications can include, but are not limited to, email messages, chat sessions, postal mail, telephony calls, teleconferencing sessions, and the like. A relationship corresponding to the individuals can be automatically updated responsive to the communication. For example, an affinity value associated with the relationship between the individuals can be increased based upon the communication. When no pre-existing relationship exists between the two individuals, a new social relationship can be created.

Another aspect of the present invention can include a relationship management system. The relationship management system can include a data storage framework for storing multiple relationships of a multitude of relationship categories, where relationship categories can include organizational relationships, project-specific relationships, social relationships, and other such relationships. The relationship management system can also include a query engine, a relationship illustrator, a linkage analyzer, and a relationship weight engine. The query engine can receive inquiries and responsively generate responses based on data stored within the data storage framework. At least a portion of the responses of the query engine can incorporate data from at least two of the relationship categories.

The relationship illustrator can graphically illustrate responses in the form of charts, reports, and the like. The linkage analyzer can determine at least one relationship linkage between two individuals, where each relationship linkage can include a chain of at least two relationships involving at least three individuals. Each pair of individuals in the linkage chain can be interconnected by a relationship stored within the data storage framework. The relationship weight engine can manage affinity values associated with relationships stored within the framework. The affinity values can be associated with at least a portion of the relationships and can quantify a relative strength of an associated relationship.

Another aspect of the present invention can include a software method for managing relationships. The method can include the step of receiving data for a multiplicity of relationships involving multiple individuals. In one embodiment, an affinity value can be determined for each of the relationships, where the affinity value quantifies a relative strength of an associated relationship. The relationships can also be categorized into two or more categories. The categorized relationships can be recorded. In one embodiment, at least a portion of the recorded relationships can be dynamically modified based upon communication events occurring within an information management system. The recorded relationships can be queried based upon specified relationship parameters. A relationship report can be generated responsive to this querying of the recorded relationships. The relationship report can contain relationship data from at least two of the relationship categories.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
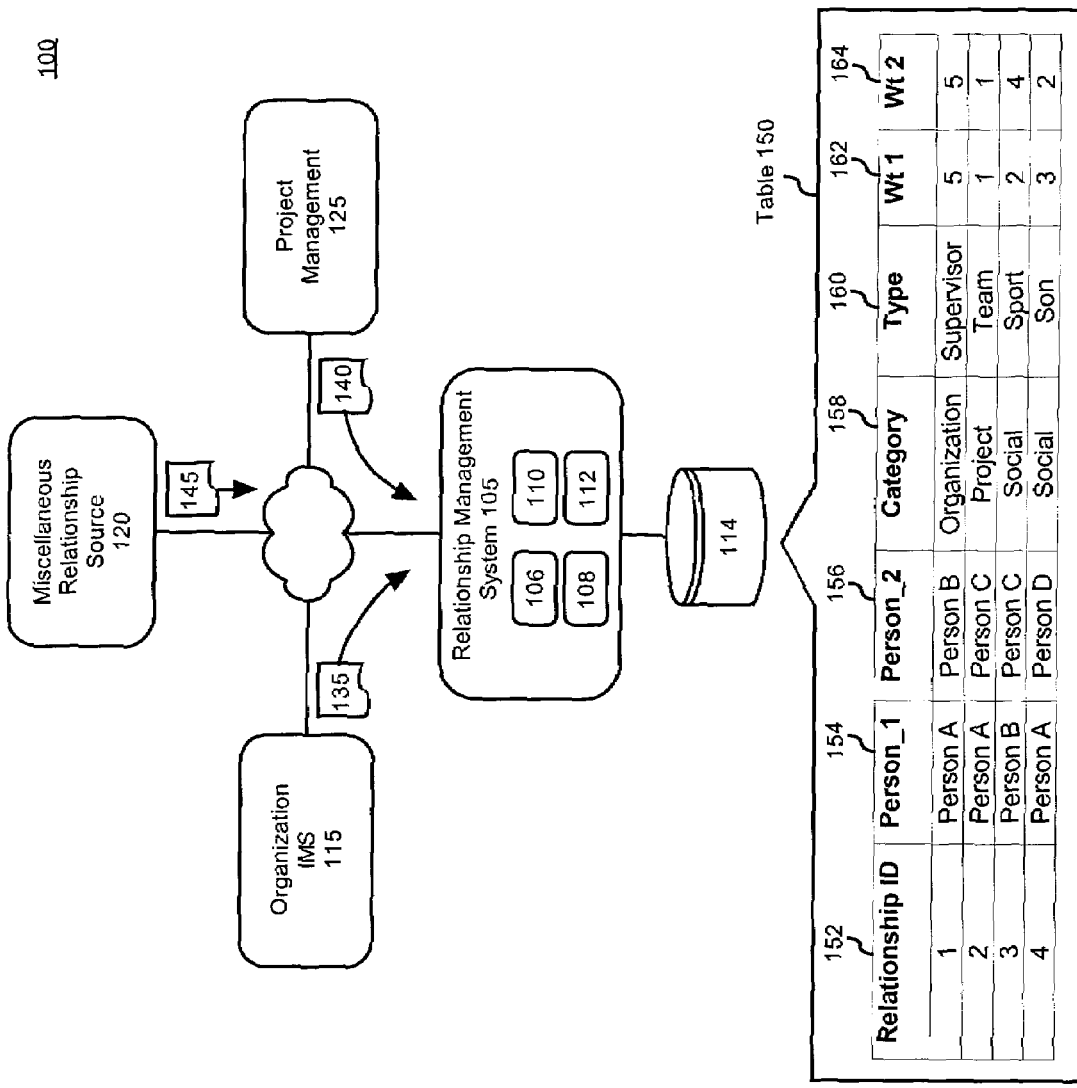
FIG. 1 is a schematic diagram illustrating an exemplary system for managing relationships according to one embodiment of the inventive arrangements disclosed herein.

FIG. 1 is a schematic diagram for a system 100 for managing relationships according to one embodiment of the inventive arrangements disclosed herein. The system 100 can include a relationship management system 105, an organization information management system (IMS) 115, a project management application 125, and a miscellaneous relationship source 120.

The relationship management system 105 can be a software application for managing a variety of different relationships existing among individuals. For example, the relationship management system 105 can manage different categories of relationships. Relationship categories can include organizational relationships, project-specific relationships, and social relationships.

Organizational relationships can be based upon relative positions and interactions between individuals based upon an organization's structure. The relationship management system 105 can receive organization-based data 135 from the organizational IMS 115. Project-specific relationships can be developed through individuals commonly participating within a team on a specific project. The project management application 125 can provide project-based data to the relationship management system 105.

Social relationships can represent relationships that exist between individuals within an organization that develop outside the formal relationship channels of the organization. For example, social relationships can be friendships developed through interactions, membership in the same clubs, common hobbies, and the like. Social relationships can also include formal relationships existing between individuals, such as genealogical relationships. Miscellaneous relationship sources 120, such as genealogy applications, contact management applications, communication tracking applications, networked entertainment applications, and the like, can provide social data 145 to the relationship management system 105.

The relationship management system 105 can include a query engine 106, a relationship weight engine 108, a relationship illustrator 110, and/or a linkage analyzer 112. The query engine 106 can receive relationship inquiries and generate responses based on data stored within the relationship data store 114. Queried data can be based upon any relationship category. The relationship weight engine 108 can manage relationship strength values called affinity values for the relationship management system 105. For example, the relationship weight engine 108 can assign, edit, delete, and otherwise manipulate affinity values. Affinity values can be numeric weights associated with each relationship that quantify a relative strength of the relationship.

The relationship illustrator 110 can graphically present query results generated by the query engine 106. For example, the relationship illustrator 110 can construct organizational charts, project responsibility charts, and other illustrative relationship charts for the relationship management system 105. Charts generated by the relationship illustrator 110 can be unified relationship charts that can illustrate individuals interconnected by a set of relationships from a plurality of relationship categories.

The linkage analyzer 112 can determine relationship linkages that exist between two or more individuals. A relationship linkage can include a chain of paired relationships that link one individual to another. For example, if A is related to B and B is related to C, then a relationship linkage of A-B-C exists. The linkage analyzer 112 can compare the relative strengths of a multitude of relationship linkages and determine the strongest relationship path existing between two individuals. A value called a linkage strength can be used to quantify the strength of a relationship linkage.

The data gathered by the relationship management system 105 can be recorded in a relationship data store 114 according to a previously determined data model or data storage framework. The relationship data store 114 can include common data manipulation capabilities such as data storage, data retrieval, and data querying capabilities. In one embodiment, the relationship data store 114 can be implemented as a database instance within a database management system.

Table 150 illustrates an exemplary table stored in the relationship data store 114. The table 150 can include columns 152, 154, 156, 158, 160, 162, and 164. Column 152 can contain a relationship identifier that can be an indexed primary key for relationship records. Column 154 can contain a foreign primary key for a first person involved within the relationship indicated in column 152. Column 156 can contain a foreign primary key for a second person involved in the relationship. Column 158 can indicate the category type into which a relationship can be classified. In one embodiment, where the relationship management system 105 is integrated with the organization IMS 115, the project management application 125, and/or miscellaneous relationship sources 120, the value stored within column 158 can be a foreign key value for referencing data contained within the appropriate integrated system.

Column 160 can contain a type of relationship. The type of relationship can be a further breakdown or subdivision of relationship from that within column 158 identifying the exact relationship between the first person and the second person. Column 162 can contain a weight that indicates the strength of a relationship from the first person to the second person indicated by column 154 and column 156 respectively. Column 164 can contain a weight that indicates the strength of a relationship from the second person to the first person. When the value within column 162 for a record is the same as the value in column 164 for the same record, then the relationship is not directionally sensitive.

The rows of table 150 can be records indicating individual relationships. For example, a first row can contain the values "1," "person_a," "person_b," "organization," "supervisor," "5," and "5" for columns 152, 154, 156, 158, 160, 162, and 164 respectively. In another example, a second row can contain the values "2," "person_a," "person_c," "project," "team," "1," and "1" for columns 152, 154, 156, 158, 160, 162, and 164 respectively.

It should be noted that the data storage framework presented above for the relationship management system 105 is just one potential framework for data recordation and the present invention is not to be limited in this regard. One of ordinary skill in the art of database design can appreciate that information can be modeled in a variety of manners depending on available data manipulation tools, the quantity of records stored, desired search times, and the like. The exact manner in which relationship data is stored is unimportant so long as the essential relationships between individuals managed by the relationship management system 105 are stored in a retrievable fashion.

For example, in one embodiment, the framework used by the relationship management system 105 can be embedded within a series of tables of a relational database management system (RDBMS) constructed according to the Boyce-Codd Normal Form or the Third Normal Form (3NF). In another embodiment, indexed relationship information can be stored within one or more flat-files in a minimally normalized fashion, such as in First Normal Form (1NF) or as just raw non-normalized data. The indexed information can then be searched using any suitable search engine, such as an indexed sequential access method (ISAM) based search engine.

It should be further noted that the relationship manage system 105 need not categorize relationships in any particular fashion, such as by organizational relationship, project-specific relationship, and social relationship. Instead, any categorization of relationships can be accommodated by the present invention.

For example, the relationships managed by the relationship management system 105 can be categorized as formal and informal relationships. In such an example, formal relationships can be documented relationships relating to an organization, such as relationships relating to job titles and organizational positions. Informational relationships can be relationships that are not formally documented, such as a friendship existing between two individuals.

In another example, the relationships managed by the relationship management system 105 can be categorized as static and dynamic relationships. In that example, static relationships can be any relationships that are fixed for a significant period of time. For example, a father-son relationship can be a static relationship. A dynamic relationship, on the other hand can shift over short time periods. For example, a speaker-participant relationship at a seminar can be a dynamic relationship.

Figure 2:
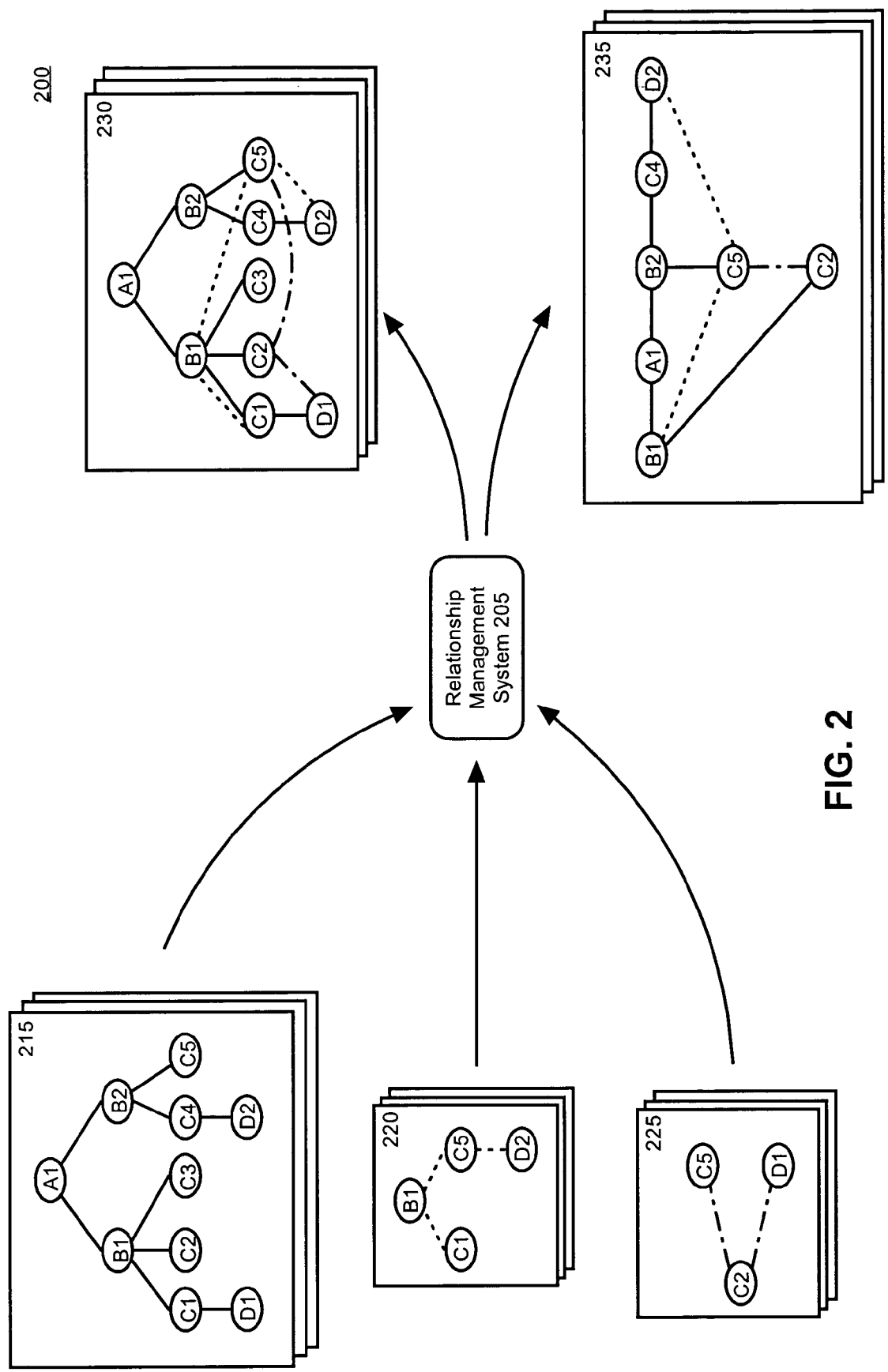
FIG. 2 is a schematic diagram illustrating an exemplary use of a relationship management system according to one embodiment of the inventive arrangements disclosed herein.

FIG. 2 is a schematic diagram 200 illustrating an exemplary use of a relationship management system 205 according to one embodiment of the inventive arrangements disclosed herein. The diagram 200 can include a relationship management system 205 that can receive a variety of different categories of relationship data and can generate an assortment of artifacts to satisfy information requests. Relationship categories can include organizational relationships, project-specific relationships, and social relationships.

Although in practice relationship data used by the relationship management system 205 can be stored in a variety of different formats and represented in many fashions, a number of conventions have been consistently utilized in diagram 200. More specifically, in diagram 200, individuals have been represented by nodes labeled A1, B1, B2, C1, C2, C3, C4, C5, D1, and D2. Identically labeled nodes appearing in multiple charts shown in diagram 200 each represent the same individual. For example, all nodes labeled A1 represent the same individual. Additionally, a relationship that exists between two individuals is represented by a line segment joining the nodes of the individuals. Moreover, organizational relationships are illustrated as solid black line segments, project-specific relationships are illustrated as a dashed line segment, and social relationships are illustrated as line segment consisting of repetitive iterations of a long dash followed by a short dash.

The organization chart 215 can include organization-based data that the relationship management system 205 can manage. More specifically, the organization chart 215 can include nodes for individuals designated by A1, B1, B2, C1, C2, C3, C4, C5, D1, and D2. The organization chart 215 can be a hierarchical chart for an organization that is lead by the individual designated A1. The second level of the organizational chart 215 includes B1 and B2, both directly supervised by A1. The third level of the organization chart 215 includes C1, C2, C3, C4, and C5, where B1 supervises C1, C2, and C3 and B2 supervises C4 and C5. The fourth level of the organization chart 215 includes D1 and D2, where C1 supervises D1 and C4 supervises D2.

Organization-based data that can be managed by the relationship management system 205 is not limited to data depicted in the organization chart 215. Instead, organization-based data can include any information relating to the structure, positions, and employees of an organization. For example, organizational positions such as president, vice-president, secretary, and the like can be included with the organization-based data. Additionally, organizational-based data can include data relating to divisions, such as a marketing division, an engineering division, a customer support division, and the like. Organizational-based data can associate individuals to designated organizational positions and can specify subordinate-supervisor relationships between individuals based upon these organizational positions.

It should be noted that individuals can be involved in a variety of different organizational relationships, which can be specified using organization-based data. For example, in an organization structured as a matrix, an individual can have one organizational relationship with a reporting supervisor, and other organizational relationships with a multitude of functional supervisors. The relationship management system 205 can manage any organizational relationships specified by organization-based data.

A project chart 220 can include project-based data that can be processed by the relationship management system 205 and stored within the information framework established for the relationship management system 205. The project chart 220 can include nodes for individuals designated by B1, C1, C5, and D2. In the project chart 220, B1 can be the project manager that directly supervises C1 and C5 on project related matters. C1 and C5 can represent individuals, project sub-teams, functional subdivisions of a project handled by different groups, and the like. C5 can directly interact with D2.

The project-based data represented in project chart 220 can include any data relating to specific projects and project teams. For example, the project-based data can include the duration of a project, the results of the project, the positions of individuals working on the project, and the like. In one embodiment, different projects can establish relationships among project team members that are relatively stronger or relatively weaker than other project-based relationships. For example, project-based data can reflect that stronger relationships can develop between project team members as the duration of a project increases. Accordingly, the relative strength of relationships between team members can be directly proportionate to the duration of the project. In another example, the relative strength of a project-based relationship can decrease as the time since that project has been completed increases. The strength of a relationship can be quantified by an affinity value. The relationship management system 205 can manage any relationships specified by project-based data.

The social chart 225 can include social data that can be managed by the relationship management system 205. The social chart 225 can include nodes for three individuals, C2, C5, and D1. In the social chart 225, C2 can have a social relationship with both C5 and D1.

The social data can include any relationship be it transient or permanent that can exist between two or more individuals. Social data is not directly related to an organization or a project. From an organizational viewpoint, social data can represent the informal human network that exists between individuals within the organization which exists outside the formal structures established by the organization. Although social relationships can be informal, dynamic, and hidden, social relationships can form strong ties between organization members that can affect the ability of individuals within an organization to effectively interact with one another. The relationship management system 205 can manage any variety of social data.

The relationship management system 205 can include the capabilities to perform queries against stored data and to generate results based upon those queries. The results can include reports and charts. Two types of charts that the relationship management system 205 can generate are unified relationship charts, such as unified relationship chart 230, and relationship linkage charts, such as relationship linkage chart 235.

The unified relationship chart 230 can include data from a variety of different relationship categories. The unified relationship chart 230 includes nodes for individuals designated A1, B1, B2, C1, C2, C3, C4, C5, D1, and D2. The manner in which nodes are arranged and the organizational links between nodes are identical in the unified chart 230 as the arrangements and links of the organization chart 215. Additionally, the unified chart 230 illustrates the relationships data shown in project chart 220 and social chart 225. Accordingly, project-specific relationships between B1 and C1, between B1 and C5, and between C5 and D2 are shown as dashed lines in unified relationship chart 230. Similarly, social relationships between C2 and C5 and between C2 and D1 are shown in the unified relationship chart 230 as line segments characterized by a long dash followed by a short dash.

It should be noted that unified relationship charts, such as unified relationship chart 230, need not be organized as organization charts but can be arranged in any fashion. One of ordinary skill in the art can appreciate that any chart illustrating multiple relationships among individual, where the illustrated relationships can be classified as different relationship categories, can be depicted by unified relationship charts and that the invention is not limited in this regard.

For example, a unified relationship chart generated by the relationship management system 205 can illustrate all individuals participating within a golf outing arranged according to tee-off times and golfing group. Such a unified relationship chart can color code nodes for golfers according to the pay-grade of the golfers within an organization. Further, project-based relationships existing between golfers can be illustrated with color-coded line segments that connect the nodes representing the golfers.

The relationship linkage chart 235 can be generated by the relationship management system 205 to illustrate a chain of relationships that connect B1 to D2. The relationship linkage chart 235 can illustrate multiple relationship linkages. The relationship linkage with the fewest number of intermediary relationships from B1 to D2 is the relationship linkage of B1-C5-D2, which includes two project-based relationships (B1-C5 and C5-D2). An alternative relationship linkage shown in relationship linkage chart 235 can be the linkage B1-C2-C5-D2 involving three relationships (B1-C2, C2-C5, and C5-D2). Another relationship linkage shown in relationship linkage chart 235 can be linkage B1-A1-B2-C4-D2 that is formed using only organizational relationships.

Each relationship linkage can have associated linkage strength, indicating the relationship strength or weakness of the linkage. The linkage strengths can be used to determine the strongest relationship linkage connecting two individuals. All other things being equal, the linkage with the shortest number of intervening relationships can have the most advantageous relationship strength.

However, in particular embodiments, different relationships can have affinity values associated with them. An affinity value can quantify the relative strength or intensity of a relationship. Accordingly, a linkage strength can depend upon both the number of relationships joining two individuals and the associated affinity values.

For example, the linkage strength for a linkage A-B-C can be determined, where relationship A-B has an affinity value of "2" and where relationship B-C has an affinity value of "3." The linkage strength can be a value of "5" calculated by adding the affinity values for relationships A-B and B-C. In such an example, close relationships can be associated with relatively lower linkage strengths than more distant relationships (much like a golf score, where the lower a golf score, the better the golf game). The calculation of linkage strengths, however, is not restricted to any particular computation algorithm and any suitable computation algorithm can be utilized.

In one embodiment, a default affinity value can be established for each relationship category. For example, organizational relationships can be assigned a different default value than project-specific relationships. Moreover, different subdivisions of a category can have different affinity values. For example, a father-son relationship can be assigned a stronger affinity value than a third cousin relationship. Default affinity values for a specific relationship can be overridden to reflect a particular relationship instance. For example, the affinity value for a father-son relationship can be decreased when applied to two individuals with a relatively weak father-son relationship.

One of ordinary skill in the art can appreciate that the charts illustrated in system 200 can be utilized in a variety of fashions. For example, the charts can be printed by a reporting feature of the relationship management system 205. In another example, the charts can be displayed within a graphical user interface (GUI) associated with the relationship management system 205. In one embodiment where the charts illustrated in system 200 are displayable in a GUI, the charts can be interactively manipulated resulting in corresponding changes being made to the underlying data store of the relationship management system 205. For example, a user of such a GUI can edit a connection between A1 and B1 in a graph displaying organization-based data 215, resulting in an appropriate change in the numeric weight associated with the organizational relationship between A1 and B2.

Figure 3:
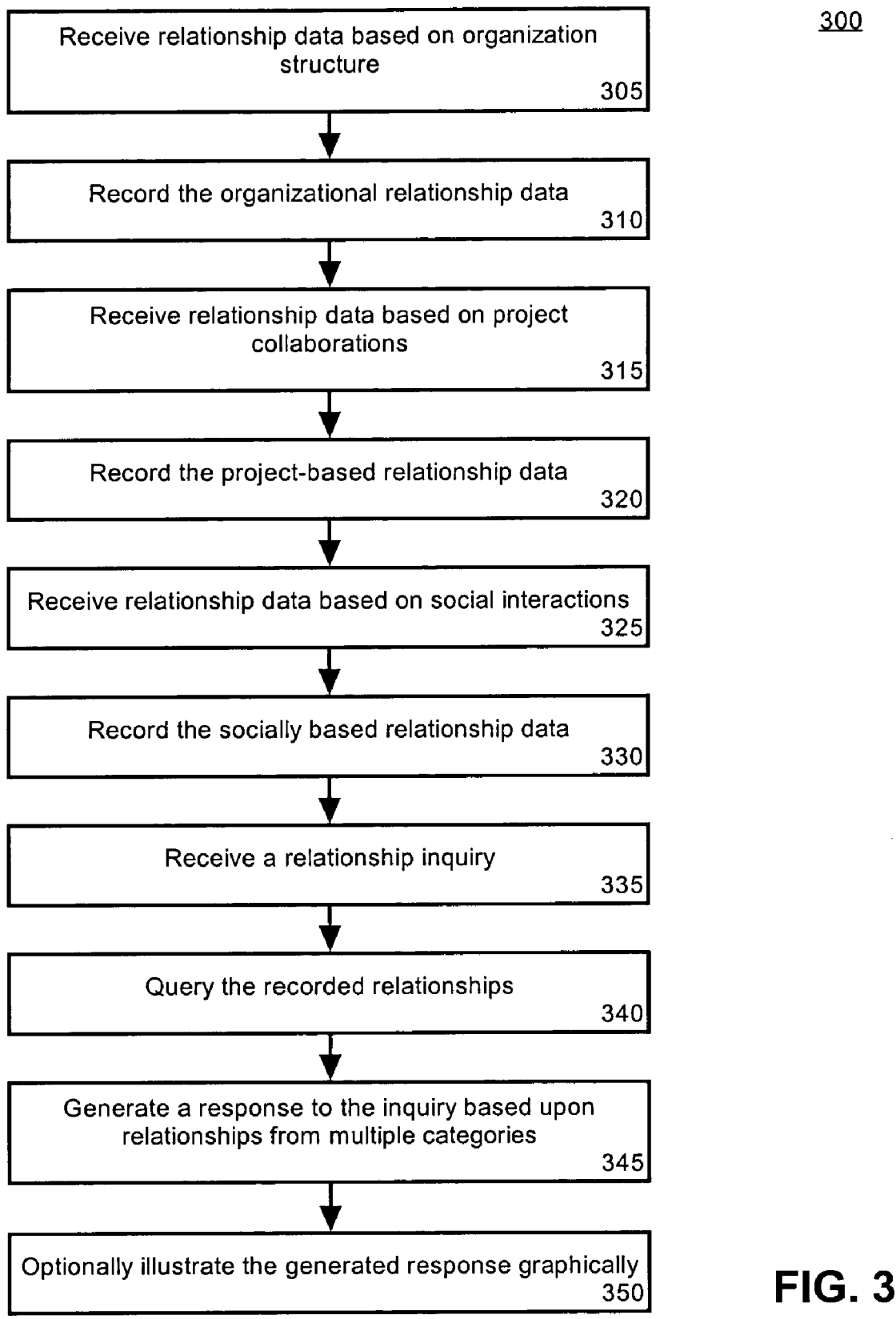
FIG. 3 is a flow chart illustrating a method for managing relationships according to one embodiment of the inventive arrangements disclosed herein.

FIG. 3 is a flow chart illustrating a method 300 for managing relationships according to one embodiment of the inventive arrangements disclosed herein. The method 300 can be a software method preformed using any of a variety of computing devices, such as stand-alone computers, distributed network systems, personal data assistants, integrated computing devices, and the like. The method 300 can begin in step 305 where relationship data that is based upon an organizational structure can be received. Organizational relationship data can specify the various divisions, positions, and other structural components of an organization and the manner in which the organization is structurally formed. Organizational relationships are commonly illustrated in organization charts that show a hierarchy of authority existing within an organization. In step 310, the organizational relationship data can be recorded in a relationship data store.

In step 315, relationship data based on project collaborations can be received. Project-based relationship data can include, but is not limited to, the various team members working on a project, respective positions held by team members, project results, project milestones and subtasks, durations in which team members participated in tasks, and the like. In step 320, the project-based relationship data can be recorded within the relationship data store.

In step 325, relationship data based on social interactions can be received. Social interactions can refer to a myriad of relationships not specially relating to an organization and/or an organization related task. For example, social interactions can include a relationship between individuals resulting from common membership in a charity, church, hobby group, sports team, gym, and the like. Social interactions can also include relationships formed by lineage, marriage, and other family relationships.

Additionally, social interactions can include bonds, like friendships, that are formed from interpersonal interactions over time. The strength of this type of social relationship can be inferred by the quantity of communications between individuals. For example, two individuals who exchange email and/or telephone calls on a daily basis can be assumed to have a relatively stronger relationship than two individuals that communicate once a month. In step 330, the socially based relationship data can be recorded in the relationship data store.

In one embodiment, relative relationship strengths can be dynamically altered based on detected communication events. For example, an email communication event between two individuals can be detected and used to automatically adjust the relative relationship strength between the involved individuals. In another example, monthly telephone records and postal mail records can be used to dynamically adjust suitable relationship strengths. When communication events occur between project team members during the duration of a project collaboration, the communication events can be determined to be related to the project. Therefore, the relationship strength of the project-based relationship between the communicating individuals can be adjusted. Alternatively, when there does not appear to be a work-related reason for communication events to occur between individuals, a strength of a social relationship between the involved individuals can be automatically adjusted responsive to a communication event or series of communication events.

In step 335, a software application can receive a relationship inquiry. In step 340, the software application can access the relationship data store and perform one or more queries. In one embodiment, the relationship data store can be a database and the queries can be standard database queries, such as Structured Query Language (SQL) queries. In another embodiment, the relationship data can be stored in a series of files and queried based on proprietary, application specific routines. In step 345, the software application can generate a response to the inquiry based upon data gathered from the relationship data store. The response can be based upon relationships of more than one relationship category. In step 350, the response can be optionally illustrated in a graphic manner. For example, a response can include a unified relationship chart and/or a relationship linkage chart.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for analyzing relationships between at least a first and second person comprising the steps of:

with respect to at least one of the relationships between at least the first and second persons, obtaining relationship data from different categories and recording the relationship data from each category in a relationship data store, wherein the different categories comprise:

organizational relationship data based upon an organization structure;

project-based relationship data based upon project-specific collaborations; and social relationship data based upon social interactions;

with respect to at least one of the relationships between at least the first and second persons:

assigning a first affinity value to the at least one relationship to indicate the relative strength of the relationship in a first direction, the first direction being from the first person to the second person; and assigning a second affinity value to the at least one relationship to indicate the relative strength of the relationship in a second direction, the second direction being from the second person to the first person, whereby the at least one relationship is a bidirectional relationship;

dynamically and continuously altering, by a computer, the first and second affinity values based on detected communication events including informal social interactions between at least the first and second persons;

receiving a relationship inquiry regarding at least the first and second persons;

querying the relationship data recorded in the relationship data store;

generating a response, by the computer, to the relationship inquiry based upon data gathered from the relationship data store;

graphically illustrating the response in a unified relationship chart and a relationship linkage chart, wherein the unified relationship chart illustrates at least one of the relationships between at least the first and second persons using data from at least two of the different categories, and wherein the relationship linkage chart illustrates at least one relationship linkage including a chain of relationships that connect at least the first and second persons; and displaying the unified relationship chart and the relationship linkage chart in a graphical user interface of the computer, wherein the displayed unified relationship chart and relationship linkage chart can be interactively manipulated resulting in corresponding changes being made to the underlying relationship data store.

2. The method of claim 1, said querying step further comprising the steps of:

identifying and determining at least one relationship linkage between said first and second persons.

3. The method of claim 2, said determining step further comprising the steps of: determining at least two relationship linkages between said first and second persons; determining a linkage strength for said each relationship linkage; and selecting a preferred one of said relationship linkages based upon said linkage strengths.

4. The method of claim 3, wherein each linkage strength is based at least in part upon affinity values for relationships included within relationship linkages.

5. The method of claim 1, wherein the unified relationship chart and the relationship linkage chart are generated by the steps of: illustrating persons as nodes and relationships as line segments connecting said nodes; and illustrating the different categories using visually distinct line segments.

6. The method of claim 1, further comprising the steps of:

dynamically modifying at least a portion of said recorded relationship data based upon communication events occurring within an information management system.

7. A computer-implemented relationship management system comprising:

a computing device that obtains different categories of relationship data comprising organizational relationship data based upon an organization structure, project-based relationship data based upon project-specific collaborations, and social relationship data based upon social interactions;

a relationship data store that stores different categories of relationship data comprising the obtained organizational relationship data, project-specific relationship data, and social relationship data;

a relationship weight engine that, with respect to at least one relationship between at least a first and second persons, assigns a first affinity value to the relationship to indicate the relative strength of the relationship in a first direction, the first direction being from the first person to the second person; and assigns a second affinity value to the relationship to indicate the relative strength of the relationship in a second direction, the second direction being from the second person to the first person, whereby the at least one relationship is a bidirectional relationship;

a computing device that dynamically and continuously alters the first and second affinity values based on detected communication events including informal social interactions between at least the first and second persons;

a query engine that receives inquiries regarding at least the first and second persons, queries the relationship data recorded in the relationship data store, and generates responses based on data gathered from the relationship data store; and a relationship illustrator that graphically illustrates the responses in a unified relationship chart and a relationship linkage chart, wherein the unified relationship chart illustrates at least one of the relationships between at least the first and second persons using data from at least two of the different categories, and wherein the relationship linkage chart illustrates at least one relationship linkage including a chain of relationships that connect at least the first and second persons; and a graphical user interface for displaying the unified relationship chart and the relationship linkage chart, wherein the displayed unified relationship chart and relationship linkage chart can be interactively manipulated resulting in corresponding changes being made to the underlying relationship data store.

8. The relationship management system of claim 7, further comprising: a linkage analyzer configured to determine at least one relationship linkage between two persons.

9. A machine-readable storage having stored thereon, a computer program having a plurality of code sections, said code sections executable by a machine for causing the machine to perform the steps of:

with respect to at least one of the relationships between at least a first and second persons, obtaining relationship data from different categories and recording the relationship data from each category in a relationship data store, wherein the different categories comprise:
organizational relationship data based upon an organization structure;
project-based relationship data based upon project-specific collaborations; and
social relationship data based upon social interactions;

with respect to at least one of the relationships between at least the first and second persons:
assigning a first affinity value to the at least one relationship to indicate the relative strength of the relationship in a first direction, the first direction being from the first person to the second person; and
assigning a second affinity value to the at least one relationship to indicate the relative strength of the relationship in a second direction, the second direction being from the second person to the first person, whereby the at least one relationship is a bidirectional relationship;

dynamically and continuously altering the first and second affinity values based on detected communication events including informal social interactions between at least the first and second persons;

receiving a relationship inquiry regarding at least the first and second persons;

querying the relationship data recorded in the relationship data store;

generating a response to the relationship inquiry based upon data gathered from the relationship data store;

graphically illustrating the response in a unified relationship chart and a relationship linkage chart, wherein the unified relationship chart illustrates at least one of the relationships between at least the first and second persons using data from at least two of the different categories, and wherein the relationship linkage chart illustrates at least one relationship linkage including a chain of relationships that connect at least the first and second persons; and displaying the unified relationship chart and the relationship linkage chart in a graphical user interface of the computer, wherein the displayed unified relationship chart and relationship linkage chart can be interactively manipulated resulting in corresponding changes being made to the underlying relationship data store.

10. The machine-readable storage of claim 9, said querying step further comprising the steps of:
identifying and determining at least one relationship linkage between said first and second persons.

11. The machine-readable storage of claim 10, said determining step further comprising the steps of:
determining at least two relationship linkages between said first and second persons; determining a linkage strength for said each relationship linkage; and
selecting a preferred one of said relationship linkages based upon said linkage strengths.

12. The machine-readable storage of claim 11, wherein each linkage strength is based at least in part upon affinity values for relationships included within relationship linkages.

13. The machine-readable storage of claim 9, wherein the unified relationship chart and the relationship linkage chart are generated by the steps of:
illustrating persons as nodes and relationships as line segments connecting said nodes; and illustrating the different categories using visually distinct line segments.

14. The machine-readable storage of claim 9, further comprising the steps of:
dynamically modifying at least a portion of said recorded relationship data based upon communication events occurring within an information management system.

* * * * *